United States Patent
Krabbe

(10) Patent No.: US 11,268,493 B2
(45) Date of Patent: Mar. 8, 2022

(54) WIND TURBINE SAFETY BRAKE CONTROL STRATEGY

(71) Applicant: VESTAS WIND SYSTEMS A/S, Aarhus N (DK)

(72) Inventor: Michael Riis Krabbe, Struer (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 83 days.

(21) Appl. No.: 16/640,924

(22) PCT Filed: Aug. 8, 2018

(86) PCT No.: PCT/DK2018/050192
§ 371 (c)(1),
(2) Date: Feb. 21, 2020

(87) PCT Pub. No.: WO2019/037824
PCT Pub. Date: Feb. 28, 2019

(65) Prior Publication Data
US 2020/0208609 A1    Jul. 2, 2020

(30) Foreign Application Priority Data
Aug. 24, 2017  (DK) .............................. PA201770636

(51) Int. Cl.
*F03D 7/02* (2006.01)
*F03D 17/00* (2016.01)

(52) U.S. Cl.
CPC ......... *F03D 7/0244* (2013.01); *F03D 7/0224* (2013.01); *F03D 7/0264* (2013.01); *F03D 17/00* (2016.05)

(58) Field of Classification Search
CPC ..... F03D 7/0244; F03D 7/0224; F03D 7/0264
See application file for complete search history.

(56) References Cited

U.S. PATENT DOCUMENTS

2006/0210406 A1*  9/2006  Harvey ................ F16H 61/431
                                                        417/334
2009/0243295 A1   10/2009  Kammer et al.
(Continued)

FOREIGN PATENT DOCUMENTS

EP    2108825 A2    10/2009
EP    2957767 A1    12/2015
(Continued)

OTHER PUBLICATIONS

PCT International Search Report, for Application No. PCT/DK2018/050192 dated Oct. 15, 2018.
(Continued)

*Primary Examiner* — Courtney D Heinle
*Assistant Examiner* — Michael K. Reitz
(74) *Attorney, Agent, or Firm* — Patterson + Sheridan, LLP

(57) ABSTRACT

A method is provided for braking a rotor of a wind turbine. The rotor comprises rotor blades. The wind turbine comprises a pitch adjustment system for adjusting a pitch of the rotor blades. The method comprises detecting a system failure of the pitch adjustment system, estimating a current wind speed, estimating an available brake torque and estimating a required brake torque, based on the estimated current wind speed. The method further comprises determining a suitable point in time for activating a rotor brake, based on the estimated available brake torque and the estimated required brake torque. The rotor brake is then activated at the determined suitable point in time.

19 Claims, 4 Drawing Sheets

(56) References Cited

U.S. PATENT DOCUMENTS

| | | | |
|---|---|---|---|
| 2010/0068057 A1* | 3/2010 | Friedrich | F03D 7/0244 416/1 |
| 2010/0226772 A1* | 9/2010 | Deering | F03D 7/0276 416/1 |
| 2011/0068577 A1* | 3/2011 | Huang | F03D 7/0208 290/44 |
| 2012/0292903 A1* | 11/2012 | Merkel | F03D 7/028 290/44 |
| 2015/0361957 A1* | 12/2015 | Agarwal | F03D 9/257 290/44 |
| 2017/0114775 A1 | 4/2017 | Agarwal et al. | |

FOREIGN PATENT DOCUMENTS

| | | |
|---|---|---|
| WO | 2016023560 A1 | 2/2016 |
| WO | 2019037824 | 2/2019 |

OTHER PUBLICATIONS

Sun et al., "The Digital Soft Braking for Wind Turbine," E-Product E-Service and E-Entertainment (ICEEE), 2010, International Conference on IEEE, Nov. 7, 2010, 6 pages.
PCT Written Opinion or the International Searching Authority for Application No. PCT/DK2018/050192 dated Oct. 15, 2018.
Danish Patent and Trademark Office First Technical Examination for PA 2017 70636 dated Jan. 23, 2018.

\* cited by examiner

WIND TURBINE SAFETY BRAKE CONTROL STRATEGY

FIELD OF THE INVENTION

This invention relates to a method for braking a rotor of a wind turbine with a pitch adjustment system. The method comprises a step of detecting a system failure of the pitch adjustment system and a step of activating a rotor brake. This invention further relates to a wind turbine comprising a pitch adjustment system, a rotor brake and a rotor brake controller.

BACKGROUND OF THE INVENTION

In accordance with safety regulations, wind turbines must have two independent braking systems in order to assure that the turbine can still be stopped when one of these systems fails. Most single pitch actuator wind turbines, i.e. wind turbines in which a single actuator controls the pitch of all rotors simultaneously, are supplied with an aerodynamic and with a mechanical braking system. Aerodynamic braking is performed by increasing the pitch of the rotor blades in such a way that they stop turning. This process is also referred to as 'feathering'. Mechanical braking is usually done by disc brakes similar to those used in cars and trucks. In most situations, aerodynamic braking is preferred, because less heat is produced and the kinetic energy of the rotor is converted into useful electricity that can easily be transported elsewhere. The mechanical braking system is more suitable at lower wind and rotor speeds, e.g. to bring an already slowed down rotor to a full stop. The mechanical braking system mainly serves as a service or parking brake that prevents the rotor from starting to rotate while being serviced or when it is not operational for other reasons. For this reason, the mechanical brake usually also serves as a backup system for the rotor lock system, which is the primary means for holding the turbine at rest.

In the event of a failure of the pitch adjustment system, the mechanical brakes may be applied in an attempt to bring the rotor to a halt. At low wind speeds, this will usually not be a problem, but at higher wind speeds the braking torque may be insufficient for stopping the rotor and/or the mechanical braking may increase the brake temperature to such an extent that a substantial risk of fire arises.

It is an object of the invention to improve the efficacy of the braking system in the event of a pitch adjustment system failure and to reduce or eliminate the risk of fire in such situations.

SUMMARY OF THE INVENTION

According to the invention this object is achieved by providing a method for braking a rotor of a wind turbine with a pitch adjustment system. The method comprises detecting a system failure of the pitch adjustment system, estimating a current wind speed, estimating an available brake torque, estimating a required brake torque, determining a suitable point in time for activating the rotor brake and activating the rotor brake at the determined suitable point in time. The required brake torque is wind speed dependent and is therefore calculated based on the estimated wind speed. The suitable point in time is determined based on the estimated available brake torque and on the estimated required brake torque and thus also depends on the current wind speed.

With this new method for braking the rotor, it is possible to take advantage of the fact that, under normal wind conditions, the wind has peaks and drops. By estimating the actual available brake torque and the expected required braking capacity, which will mainly depend on the current wind speed, it can be ensured that the mechanical rotor brake only kicks in when it has a reasonable chance of success without heating the brakes to unsafe temperatures.

In its simplest form, the invention can be realized by using a single predetermined value for the estimated available brake torque and using only the estimated current wind speed to determine the minimum brake torque that is required to stop the rotor. The latter may, e.g., be done by using the estimated current wind speed as input for some previously stored formula or with the help of a lookup table.

Both the actually available brake torque and the minimum required available brake torque can be estimated with greater precision by taking into account more internal and external factors, such as, e.g., the current pitch angle of the rotor blades or the current yaw angle of the rotor. The pitch and yaw angle influence the effect of the wind on the rotational movement of the rotor. The wind speed estimate preferably comprises information about both the speed and the direction of the wind. Also information about the recent variability of and the trend in the wind speed may be taken into account.

It is to be noted that the term 'wind speed estimate' also includes estimates of one or more other quantities that are directly related to wind speed. The main improvement of the invention provided over the prior art is to use the variations in wind speed to establish a better strategy for braking the rotor in the event of a failure of the pitch adjustment system. For this purpose it doesn't matter if the wind speed itself or a quantity directly related thereto is measured and/or estimated.

Optionally, the braking method includes a step of yawing out of a current predominant wind direction while waiting for a suitable point in time to engage the rotor brake. The yawing out may continue after the point in time at which the rotor brake is engaged.

While waiting for the suitable point in time for activating the rotor brake, the rotating rotor may still be coupled to the power generator, which will be able to provide a braking torque to avoid runaway (i.e. uncontrollable speeding up of the rotor). If the power generator is kept connected when the rotor brake is already applied, the brake torque from the power generator adds to the total available brake torque.

In a preferred embodiment, already before a pitch adjustment system failure is detected, the rotor pitch is controlled in dependence of the estimated current wind speed, the estimated available brake torque and the estimated required brake torque, in such a way as to avoid that the estimated required brake torque exceeds the estimated available brake torque. This precautionary measure makes sure that in the event of a technical problem with the pitch adjustment system, the rotor brake will not have to wait forever for a suitable point in time to activate the rotor brake and it will still be possible to stop the rotor using the rotor brake.

According to a further aspect of the invention, a wind turbine is provided comprising a pitch adjustment system for adjusting a rotor pitch, a wind speed estimator for estimating a current wind speed, a rotor brake, and a rotor brake controller operatively connected to the rotor brake, the pitch adjustment system and the wind speed estimator. The pitch adjustment system is capable to detect a system failure of the pitch adjustment system. The rotor brake controller is configured to estimate an available brake torque and, based on the estimated current wind speed, a required brake torque. The rotor brake controller is further configured to determine a suitable point in time for activating the rotor brake and to activate the rotor brake at the determined suitable point in time, wherein the suitable point in time is determined based on the estimated available brake torque and the estimated required brake torque.

BRIEF DESCRIPTION OF THE DRAWINGS

For a better understanding of the invention, some embodiments of the invention will now be described with reference to the following drawings, in which.

DETAILED DESCRIPTION OF THE INVENTION

Figure 1:
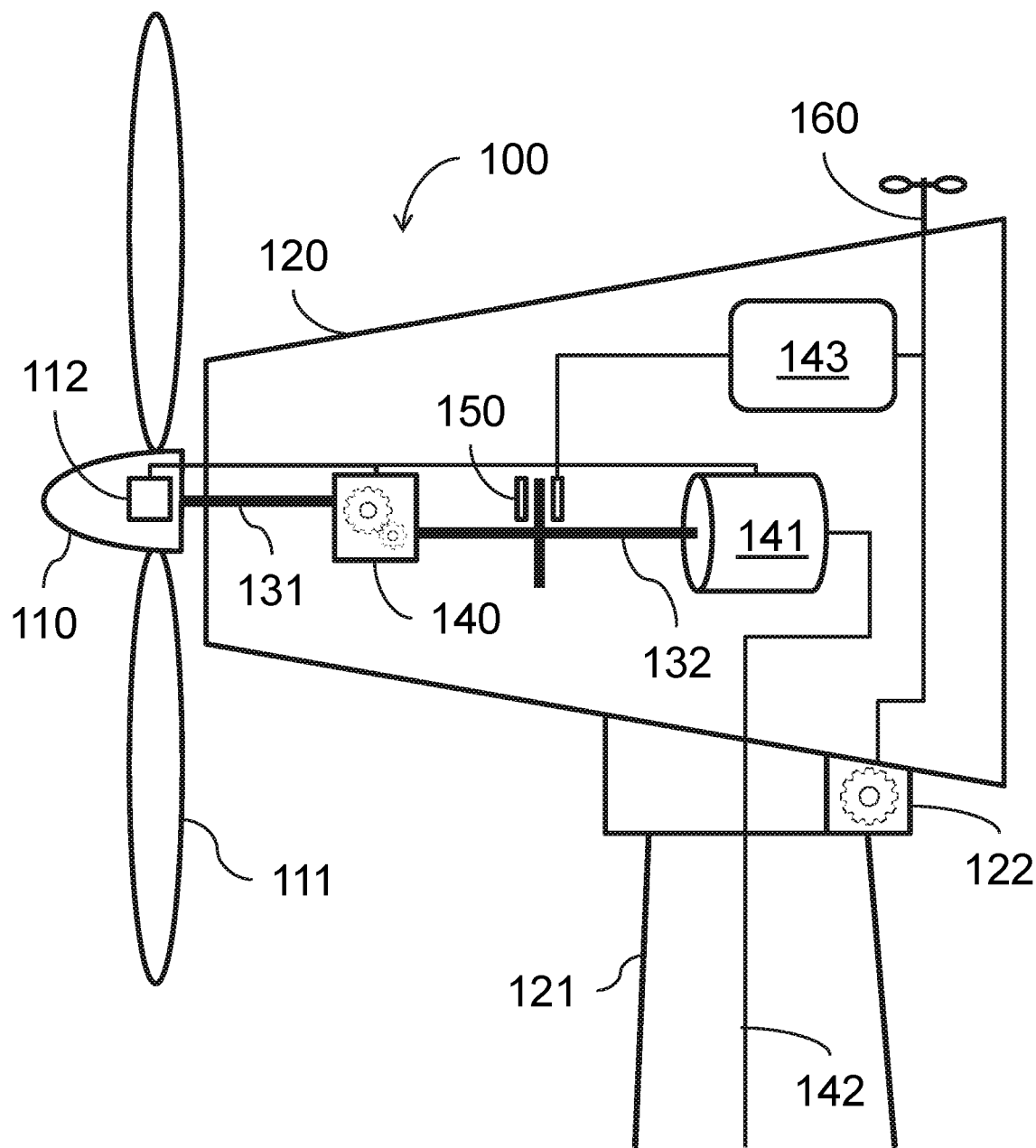
FIG. 1 schematically shows the top of a wind turbine according to the invention.

FIG. 1 schematically shows the top of a wind turbine 100 according to the invention. A wind turbine 100 usually consists of a high tower 121 with a nacelle 120 on top of it. A rotor 110 with usually three rotor blades 111 is mounted to the nacelle 120. Of course, wind turbines 100 may be equipped with rotors 110 having more or less than three rotor blades 111 attached thereto. The rotor 110 and the rotor blades 111 are designed such that when the wind exerts a thrust onto the blade surfaces, a rotor torque will make the rotor shaft 131 rotate. The stronger the wind, the higher the torque and the higher the rotor speed. The rotor shaft 131 is connected to a gear box 140, where its rotary motion is transferred to a generator shaft 132. Generally, the generator shaft 132 is rotating faster than the rotor shaft 131. Therefore, the rotor shaft 131 is usually called the low speed shaft 131, while the generator shaft 132 is also known as the high speed shaft 132. A generator 141 converts the rotational energy of the high speed shaft 132 to electrical power. A power line 142 from the generator 141 runs down the tower 121 to allow the power generated by the wind turbine 100 to be used, stored or supplied to a larger power grid at the ground level.

The rotor torque is not only dependent on the speed of the wind, but also on the angle of attack with respect to the rotor blades 111. Two systems are in place for adjusting this angle of attack. First, a yaw control system 122 is provided for rotating the nacelle 120 with respect to the turbine tower 121. When the wind turbine 120 is turned with its nose (i.e. the rotor) in the wind, it catches the most wind and delivers the most power.

The second system for adjusting the angle of attack is a pitch adjustment system 112 comprising one or more actuators for rotating the rotor blades 111 about their longitudinal axis. Changing the pitch angle of a rotor blade 111 changes the thrust exerted onto the blade surface. Pitch adjustment thereby is a practical way of maximizing the power output of the wind turbine 100, but it can also be used to slow down the rotor 110 by rotating the blades out of the wind direction. In this exemplary embodiment, the pitch adjustment system 112 is a collective pitch system actuated by a single pitch actuator. The single pitch actuator controls the pitch angles of all the rotor blades 111 at once and all rotor blades 111 have the same pitch angle. Alternatively, separate actuators may be provided for the separate rotor blades 111, thereby allowing the individual rotor blades 111 to be rotated to different pitch angles.

A mechanical rotor brake 150 is provided on the high speed shaft 132 to bring the shafts 131, 132 to a full stop, after the rotor 110 has already been slowed down aerodynamically by pitching and/or yawing the rotor blades 111 out of the wind direction. Mechanical braking is usually done by disc brakes 150 similar to those used in cars and trucks, but other mechanical braking systems may be used with similar effect. Alternatively, the mechanical braking system may be installed at the low speed shaft 131. However, at the low speed shaft 131 the required braking torque will be higher than at the high speed shaft 132, which means that a larger, heavier and/or more expensive mechanical brake will be needed to achieve the same braking power.

According to the invention, the mechanical brake 150 may be used to try to stop the rotor 110 all by itself when, due to for example an electronic or mechanical system failure, the pitch adjustment system 112 fails service and is not able to slow down the rotor 110 aerodynamically.

A controller 143 is connected to the pitch adjustment system 112, the yaw control system 122 and the mechanical rotor brake 150 in order to be able to control the operation of these system units individually and in cooperation. In operation, the controller 143 receives operational data and sensor information from the different units and provides instructions, e.g., to change the blade pitch or yaw angle and to activate or deactivate the mechanical brake 150. Additionally, if the gear box 140 has an adjustable gear ratio, the controller 143 may be coupled to the gearbox 140 for initiating gear changes. Additional sensor input for the controller 143 may, e.g., come from a wind sensor 160, temperature sensors for measuring an external temperature, temperature sensors for measuring the temperature of different wind turbine 100 components and a power output of the generator 141.

Figure 2:
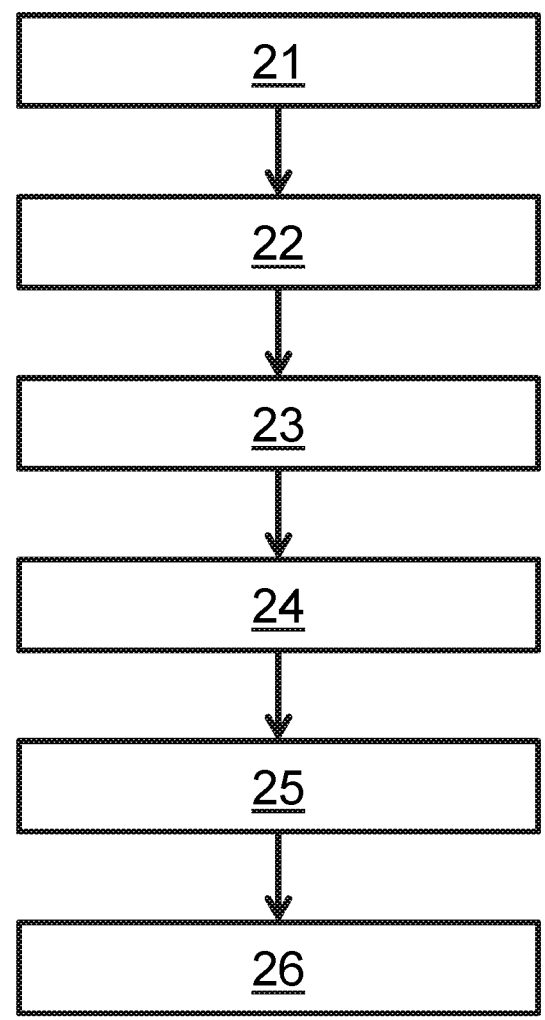
FIG. 2 shows a flow diagram of a method according to the invention.

Being able to control the different functional units of the wind turbine 100 based on the available sensor inputs, the controller 143 is configured to perform the method according to the invention. FIG. 2 shows a flow diagram of a method according to the invention. The method for braking the rotor 110 of the wind turbine 100 as shown in FIG. 2 starts with an error detection step 21 in which a system failure of the pitch adjustment system 112 is detected. The error may, e.g., be of an electrical or mechanical nature and makes it more difficult or even impossible to brake the rotor aerodynamically. If the wind speed is too high and the rotor 110 cannot be stopped, there is a risk that the wind turbine 100 is severely damaged. So, when the pitch adjustment system 112 fails service and cannot be used anymore for slowing down the rotor 110, it is desirable to try to stop the rotor 110 in some other way, before the wind turbine gets damaged. According to the invention, the mechanical brake 150 is used for this emergency stop.

However, according to the invention, the mechanical brake 150 is not always activated immediately when a system failure of the pitch adjustment system 112 is detected. Before activating the mechanical brake 150, it is first determined whether such an attempt may or may not be successful. When the rotor torque exceeds the maximum braking torque that can be exerted by the mechanical brake 150, a braking attempt will not stop the rotor 110 and will only lead to high brake temperatures and damage to the mechanical brake 150 and possibly also to other parts of the wind turbine 100.

In order to find out whether a braking attempt will be successful, in a wind speed estimating step 22, the current wind speed at or near the wind turbine 100 is estimated. The estimation 22 may include a wind speed measurement by one or more wind sensors 160. Alternatively, the wind speed may be calculated based on other operational data of the wind turbine 100, such as the current blade pitch and generator power output.

Knowing the current wind speed, or a reliable estimation thereof enables the controller 143 to estimate a required brake torque in a brake requirement estimating step 23. The higher the wind speed, the more brake torque is required. For each wind turbine 100, there is a predetermined relation between wind speed, blade pitch angle and the brake torque that will be needed to bring the rotor 110 to a halt. Such relations may, e.g., be stored in lookup tables or as predetermined parameters in a mathematical function, describing a relation. Other aspects that may be taken into account when estimating the required brake torque are the yaw angle of the wind turbine 100 or the current power output of the generator. As long as the rotor 110 is coupled to the generator 141 and the generator 141 is generating power, the generator also exerts a braking force on the high speed shaft 132 and, via the gear box 141 and the low speed shaft 131, also on the rotor 110. So, when the generator 141 is kept connected during the braking, the estimate of the required brake torque is reduced accordingly. It is to be noted that, as an alternative for the current power output, also the current speed of rotation of the high speed shaft 132 may be used. Furthermore, the rotational speed of the high speed shaft 132 is, of course, directly linked to the rotational speed of the low speed shaft 131. When the, possibly adjustable, gear ratio of the gear box 140 is known one rotational speed can easily be converted into the other.

In brake assessment step 24, the actually available brake torque is estimated. While the estimated available brake capacity of the mechanical brake 150 may just be a predetermined and fixed value, its accuracy may be improved by taking into account factors like, e.g., external temperature, brake disc and brake pad temperatures or parts wear due to extended use. It is to be noted that this brake assessment step does not require any input from the previous step of this method and may therefore also be executed at an earlier stage.

In timing step 25, the controller determines a suitable point in time for activating the mechanical rotor brake 150, based on the estimated available brake torque and the estimated required brake torque. In general, when the estimated available brake torque exceeds the estimated required brake torque, it should be possible for the mechanical brake 150 to stop the rotor 110. So in the most straightforward implementation of the method according to the invention, the controller just waits until the wind speed drops far enough for the estimated available brake torque to be larger than the estimated required brake torque. It may, however, be beneficial to use a more sophisticated strategy that takes into account safety margins for all estimated values and/or the effects of varying wind speeds. When, e.g., an analysis of available weather data and recent wind speed measurements indicates that wind speeds are likely to increase, it is more important to act quickly than when it is expected that wind speeds will drop.

Finally, in braking step 26, the mechanical rotor brake 150 is activated at the determined suitable point in time.

Optionally, the method further comprises yawing out of a current predominant wind direction after detecting the system failure and before actuating the mechanical rotor brake 150. Yawing the rotor 110 out of the predominant wind direction reduces the thrust on the rotor blade surfaces 111 and therewith also the speed of the low speed shaft 131.

As an additional, optional, safety measure, the estimates of the required and the available brake torque for mechanically braking the rotor 110 are also used for ensuring that there will always be more brake torque available than required. This can be done by continuously or periodically monitoring the wind speed and, already before detecting a system failure of the pitch adjustment system, controlling the rotor pitch such that the required brake torque does not exceed the available brake torque. Although using this additional safety measure does significantly reduce the risk of the wind turbine 100 spinning out of control, it will also limit its power output. Depending on the actual power requirements, weather circumstances and forecasts and information concerning the wind turbine 100 itself, it may or may not be useful to activate this safety measure.

Figure 3:
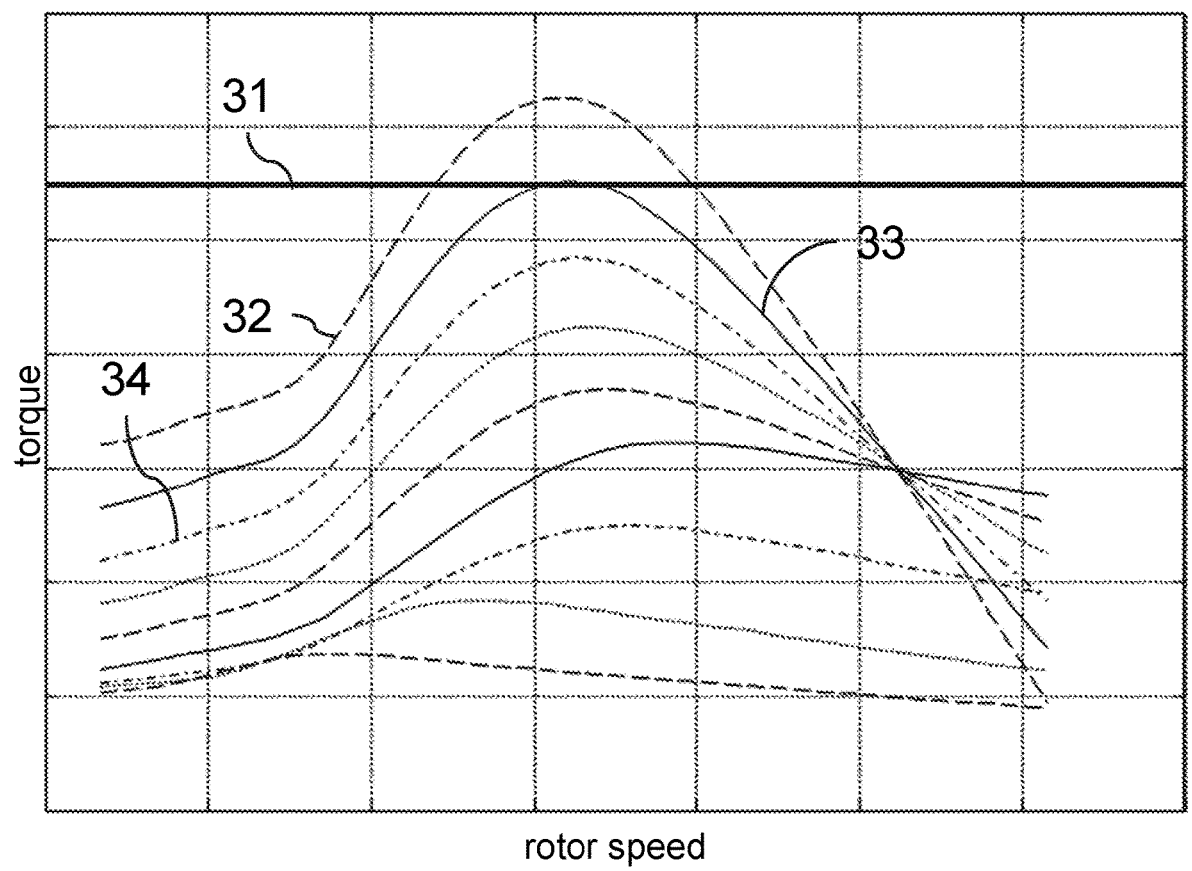
FIG. 3 shows an exemplary plot of data that may be used for performing the method according to the invention.

FIG. 3 shows an exemplary plot of data that may be used for performing the method according to the invention. The usable information from a plot like this may be stored locally in a memory integrated with or coupled to the controller 143. Alternatively, part or all of it may be stored nearby at a central data location or remotely on a server connected to the Internet or a different wide area network. The data may, e.g., be stored in the form of lookup tables or as a mathematical function defined by multiple parameters. The data may be static, or updated periodically or continuously based on sensor data, usage data or new insights into the functioning of wind turbines in general or this specific wind turbine 100 in particular.

In the plot of FIG. 3, a flat line indicates the available brake torque 31. As indicated before the available brake torque 31 will mainly depend on the design and materials used for the mechanical brake 150, but may change due to, e.g., external temperature, brake disc or brake pad temperature, humidity or parts wear. The non-linear curves in FIG. 3 show the relation between rotor speed and required brake torque 32, 33, 34 for different combinations of wind speed and pitch angles. In this example, rotor torque curve 32 represents this relation for a wind speed of 20 m/s and a corresponding optimal pitch angle. Rotor torque curve 33 and rotor torque curve 34 represent this relation for wind speeds of 18 and 16 m/s and the respective corresponding optimal pitch angles. Lower lying curves represent lower wind speeds. Because the rotor blades 111 will not always operate at their optimal pitch angle and because the system should also work when the pitch adjustment system 112 fails service during an attempt to brake the rotor 110 aerodynamically, similar rotor torque curves are also provided for different or all sub-optimal pitch angles. In FIG. 3, it can be seen that for this wind turbine 100 with this mechanical brake 150, stopping the rotor at a 16 m/s wind speed will probably not be a problem. The estimated required brake torque 34 is still well below the estimated available brake torque 32. Unexpected fluctuations in wind speed will not immediately form a problem. When the wind speed is about 18 m/s, the required brake torque 33 is more or less the same as the available brake torque 31. In such a situation, it may be better to wait for a temporary drop in wind speed, such that the available brake torque will be sufficient to slow down the rotor 110. Even if the wind speed gets back to 18 m/s afterwards, the already partly slowed down rotor 110 can still be stopped by the mechanical brakes 150. At a wind speed of 20 m/s, mechanical braking may become more problematic. Such a situation may be avoided by, as a preventive measure, keeping the rotor speed below the optimal value and thereby reducing the rotor torque. Alternatively, the generator 141 may remain coupled to the rotor 110 while braking, thereby adding some additional braking torque to the combined braking system. However, at certain wind speeds, also such a combined braking system will not be able to bring the rotor 110 to a halt.

Figure 4:
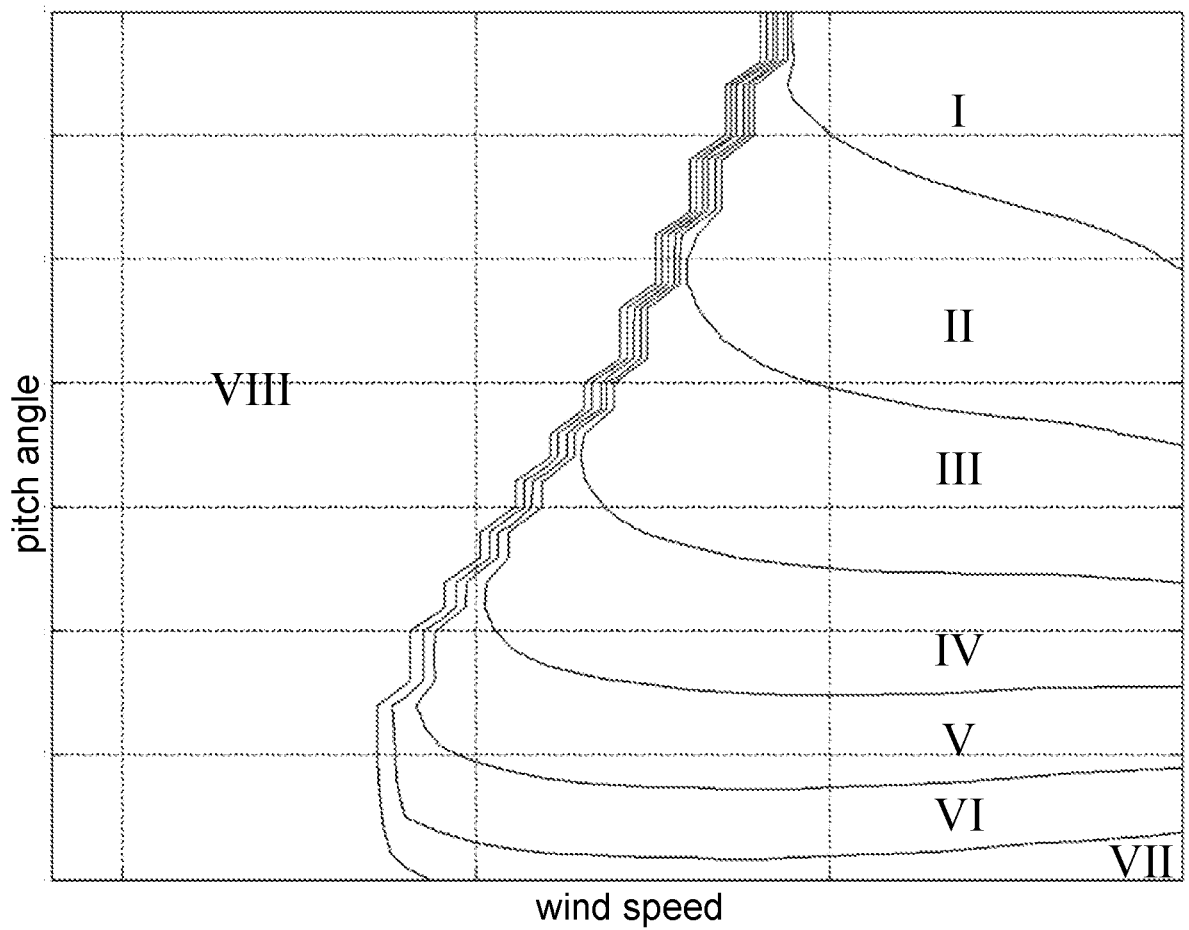
FIG. 4 shows another exemplary plot of data that may be used for performing the method according to the invention.

FIG. 4 shows another exemplary plot of data that may be used for performing the method according to the invention. This data may be stored in the same way as described above for the data shown in FIG. 3. For every combination of wind speed and pitch angle, FIG. 3 shows a maximum breakable generator speed. Generator speed is the speed of the high speed shaft 132 connected to the generator. For illustrative purposes, the maximum breakable generator speed is indicated by eight distinct regions. For example, region I corresponds to a maximum breakable generator speed of 400 rpm, region II to 600 rpm, up to 1800 rpm for region VIII. In practice, more regions may be used or a lookup table may provide the maximum breakable generator speed for every possible combination of wind speed and pitch angle. Alternatively, a mathematical formula may be used for converting every possible combination of wind speed and pitch angle to a maximum breakable generator speed.

The invention claimed is:

1. A method for braking a rotor of a wind turbine, the rotor comprising rotor blades and the wind turbine comprising a pitch adjustment system for adjusting a pitch of the rotor blades, the method comprising:
   detecting a system failure of the pitch adjustment system;
   estimating a current wind speed;
   estimating an available brake torque;
   estimating a required brake torque based on the estimated current wind speed; and
   in response to detecting the system failure and in response to determining that the estimated required brake torque exceeds the estimated available brake torque, waiting to activate a rotor brake until the estimated current wind speed reduces such that the estimated required break torque falls below the estimated available brake torque.

2. The method for braking a rotor of a wind turbine as claimed in claim 1, wherein estimating the required brake torque is further based on a current pitch angle of the rotor blades.

3. The method for braking a rotor of a wind turbine as claimed in claim 1, wherein estimating the required brake torque is further based on a current yaw angle of the rotor.

4. The method for braking a rotor of a wind turbine as claimed in claim 1, wherein estimating the required brake torque is further based on a current generator speed.

5. The method for braking a rotor of a wind turbine as claimed in claim 1, wherein estimating the required brake torque is further based on a current power output of the wind turbine.

6. The method for braking a rotor of a wind turbine as claimed in claim 1, wherein estimating the available brake torque is further based on a current brake disc temperature.

7. The method for braking a rotor of a wind turbine as claimed in claim 1, wherein a power generator of the wind turbine is kept connected when the rotor brake is activated and wherein the step of estimating the available brake torque is further based on an estimated power generator brake torque.

8. The method for braking a rotor of a wind turbine as claimed in claim 1, further comprising yawing out of a current predominant wind direction after detecting the system failure.

9. The method for braking a rotor of a wind turbine as claimed in claim 1, further comprising, before detecting the system failure, controlling a rotor pitch to avoid an estimated required brake torque from exceeding an estimated available brake torque.

10. A wind turbine comprising:
    a rotor with rotor blades;
    a pitch adjustment system for adjusting a pitch of the rotor blades and capable to detect a system failure of the pitch adjustment system;
    a wind speed estimator for estimating a current wind speed;
    a rotor brake; and
    a rotor brake controller operatively connected to the rotor brake, the pitch adjustment system and the wind speed estimator the rotor brake controller being configured to:
      estimate an available brake torque;
      estimate a required brake torque based on the estimated current wind speed; and
      in response to detecting the system failure and in response to determining that the estimated required brake torque exceeds the estimated available brake torque, waiting to activate the rotor brake until the estimated current wind speed reduces such that the estimated required break torque falls below the estimated available brake torque.

11. The wind turbine as claimed in claim 10, wherein the pitch adjustment system is a collective pitch system actuated by a single pitch actuator.

12. A computer readable medium containing a program which, when executed by one or more processors, performs operation for braking a rotor of a wind turbine, the rotor comprising rotor blades and the wind turbine comprising a pitch adjustment system for adjusting a pitch of the rotor blades, the operation comprising:
    detecting a system failure of the pitch adjustment system;
    estimating a current wind speed;
    estimating an available brake torque;
    estimating a required brake torque based on the estimated current wind speed; and
    in response to detecting the system failure and in response to determining that the estimated required brake torque exceeds the estimated available brake torque, waiting to activate a rotor brake until the estimated current wind speed reduces such that the estimated required break torque falls below the estimated available brake torque.

13. The computer readable medium as claimed in claim 12, wherein estimating the required brake torque is further based on a current pitch angle of the rotor blades.

14. The computer readable medium as claimed in claim 12, wherein estimating the required brake torque is further based on a current yaw angle of the rotor.

15. The computer readable medium as claimed in claim 12, wherein estimating the required brake torque is further based on a current generator speed.

16. The computer readable medium as claimed in claim 12, wherein estimating the required brake torque is further based on a current power output of the wind turbine.

17. The computer readable medium as claimed in claim 12, wherein estimating the available brake torque is further based on a current brake disc temperature.

18. The computer readable medium as claimed in claim 12, wherein a power generator of the wind turbine is kept connected when the rotor brake is activated and wherein the step of estimating the available brake torque is further based on an estimated power generator brake torque.

19. The computer readable medium as claimed in claim 12, further comprising yawing out of a current predominant wind direction after detecting the system failure.

\* \* \* \* \*